(12) United States Patent
Rose et al.

(10) Patent No.: US 7,380,815 B2
(45) Date of Patent: Jun. 3, 2008

(54) LOWER SIDE PILLER PASSENGER INFLATABLE SAFETY RESTRAINT ASSEMBLY

(75) Inventors: Larry D. Rose, South Weber, UT (US); Jesse R. Crookston, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 409 days.

(21) Appl. No.: 10/818,294

(22) Filed: Apr. 5, 2004

(65) Prior Publication Data

US 2005/0218634 A1 Oct. 6, 2005

(51) Int. Cl.
*B60R 21/021* (2006.01)

(52) U.S. Cl. .................. 280/730.2; 280/728.2; 280/730.1

(58) Field of Classification Search ............ 280/730.2, 280/728.2, 730.1
See application file for complete search history.

(56) References Cited

U.S. PATENT DOCUMENTS

| | | | |
|---|---|---|---|
| 5,362,097 A | | 11/1994 | Barske |
| 5,368,329 A | * | 11/1994 | Hock ........................ 280/741 |
| 5,564,734 A | | 10/1996 | Stückle |
| 5,575,497 A | | 11/1996 | Suyama et al. |
| 5,921,575 A | * | 7/1999 | Kretschmer et al. ..... 280/728.2 |
| 5,992,877 A | * | 11/1999 | Gray ....................... 280/730.1 |
| 6,234,515 B1 | * | 5/2001 | Iwanaga .................. 280/728.2 |
| 6,364,350 B2 | | 4/2002 | Hoagland |
| 6,382,660 B1 | | 5/2002 | Starner et al. |
| 6,386,581 B1 | * | 5/2002 | Ohno ........................ 280/735 |
| 6,607,210 B2 | | 8/2003 | Eckert et al. |
| 6,808,198 B2 | * | 10/2004 | Schneider et al. ....... 280/730.1 |
| 2001/0028161 A1 | | 10/2001 | Hoagland |
| 2001/0040364 A1 | | 11/2001 | Viano et al. |
| 2002/0140209 A1 | * | 10/2002 | Waid et al. .............. 280/728.2 |
| 2003/0178821 A1 | | 9/2003 | Schneider et al. |

FOREIGN PATENT DOCUMENTS

WO WO 99/55556 11/1999
WO WO 01/08935 2/2001

* cited by examiner

*Primary Examiner*—Kevin Hurley
*Assistant Examiner*—Timothy Wilhelm
(74) *Attorney, Agent, or Firm*—Sally J Brown; Pauley Petersen & Erickson

(57) ABSTRACT

An inflatable safety restraint assembly for a vehicle having a front instrument panel and a side pillar. The inflatable safety restraint assembly includes an inflator device and a gas flow control structure connected in gas flow communication to the inflator device to receive inflation gas supplied by the inflator device. The inflatable safety restraint assembly also includes an airbag cushion that is connected in gas flow communication to the gas flow control structure. Upon activation of the inflator device, initial deployment of the airbag cushion occurs from a lower portion of the side pillar. The initial deployment of the airbag cushion occurs in a cross-vehicle direction toward a longitudinal centerline of the vehicle.

24 Claims, 5 Drawing Sheets

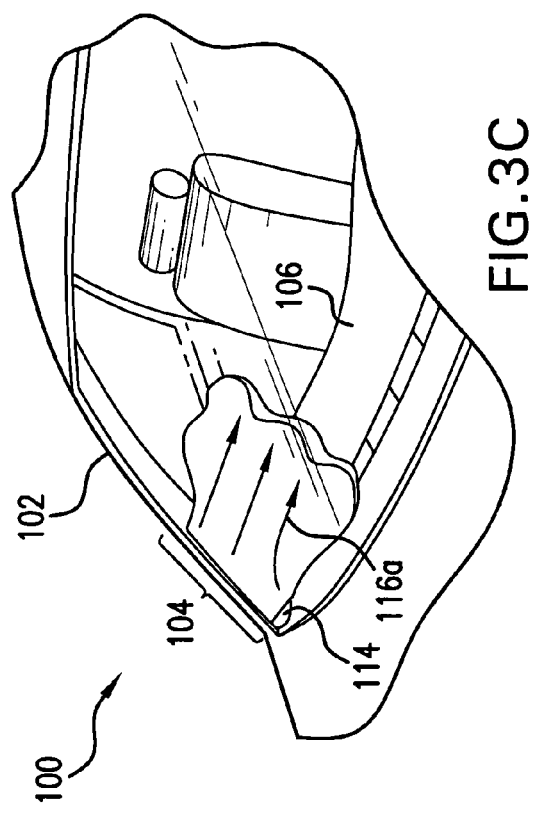
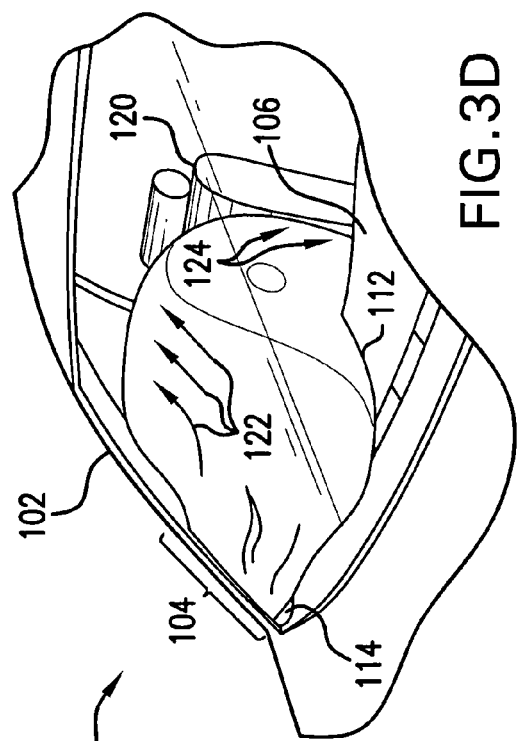
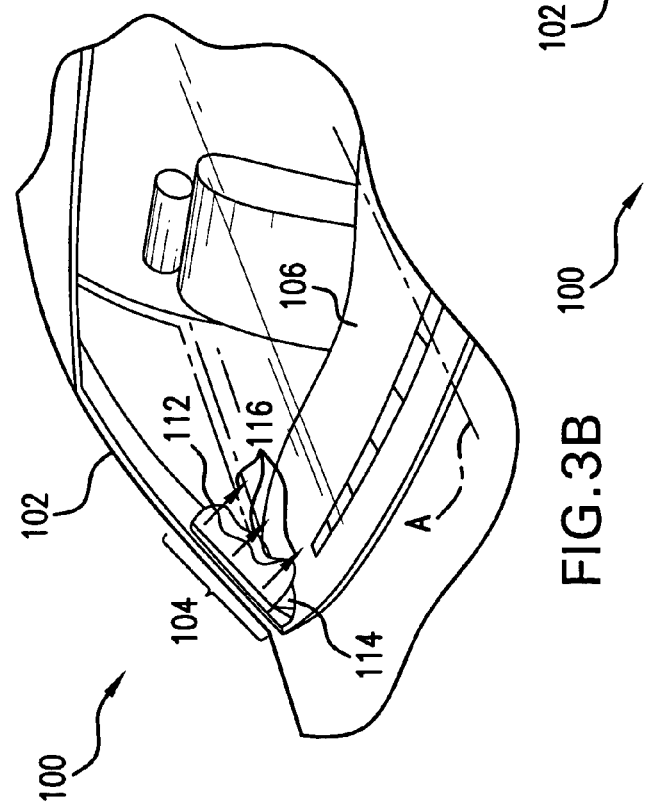

LOWER SIDE PILLER PASSENGER INFLATABLE SAFETY RESTRAINT ASSEMBLY

BACKGROUND OF THE INVENTION

This invention relates generally to inflatable safety restraint assemblies and, more particularly, an inflatable safety restraint assembly including an inflatable airbag cushion for use in a vehicle such as an automobile.

It is well known to protect a vehicle occupant by means of inflatable restraint systems which self-actuate from an undeployed or static state to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushion(s) may desirably deploy into one or more locations within the vehicle between the occupant and certain parts of the vehicle interior, such as the doors, steering wheel, dashboard or the like, to prevent or avoid the occupant from forcibly striking such parts of the vehicle interior.

Current front passenger inflatable restraint systems typically include a module assembly located beneath, or within, a front instrument panel. Upon an occurrence of a collision, an airbag cushion inflates and typically deploys in front of the occupant such as through a deployment door opened by the inflating airbag cushion. Recently, an increased focus has been given to minimizing and/or eliminating injuries to an out-of-position occupant, i.e., an occupant not seated in the optimal passenger riding position. Current front passenger inflatable restraint systems may have difficulty providing desired out-of-position occupant protection, particularly due to, for example, the opening of the deployment door and initial inflation forces. In addition, automobile manufacturers often add costly occupant detection systems to supplement current front passenger inflatable restraint systems.

Current passenger inflatable restraint systems located beneath the front instrument panel typically have other disadvantages as well. One example is the cost associated with designing and constructing a visually appealing and functional deployment door. Another disadvantage is the amount of space within the instrument panel encompassed by passenger airbag module, thereby limiting, for example, instrument panel styling and glove box size.

There is a need for an improved inflatable restraint system. More particularly, there is a need for an improved passenger side inflatable restraint system that requires less space within the front instrument panel of the vehicle.

SUMMARY OF THE INVENTION

A general object of the invention is to provide an improved inflatable safety restraint assembly.

A more specific objective of the invention is to overcome one or more of the problems described above.

The general object of the invention can be attained, at least in part, through an inflatable safety restraint assembly for a vehicle having a side pillar. The inflatable safety restraint assembly includes an inflator device and an airbag cushion connected in gas flow communication with the inflator device. When the airbag cushion is in a static state, a portion of the airbag cushion is disposed in a lower portion of the side pillar of the vehicle.

In contrast to the inflatable safety restraint assembly of the invention, the prior art generally fails to provide an inflatable safety restraint assembly that minimizes and/or eliminates injuries to an out-of-position occupant and that does not occupy a relatively large area beneath the front instrument panel.

The invention further comprehends an inflatable safety restraint assembly for a vehicle having a front instrument panel and a side pillar. The inflatable safety restraint assembly includes an inflator device. The inflatable safety restraint assembly also includes a gas flow control structure connected in gas flow communication to the inflator device to receive inflation gas supplied by the inflator device. A storage housing is attached to the gas flow control structure. The storage housing defines a storage chamber. An airbag cushion is connected in gas flow communication to the gas flow control structure. A portion of the gas flow control structure is disposed in the side pillar. The storage housing is disposed below the front instrument panel. In a static state, a first portion of the airbag cushion is disposed in the side pillar and a second portion of the airbag cushion is disposed in the storage chamber.

As used herein, references to "gas flow communication" are to be understood to generally refer to a direct or indirect connection or attachment between two or more components that allows gas, such as inflation gas, to pass from one structure to the other.

Further, references herein to "inflation communication" are to be understood to generally refer to a direct or indirect connection or relationship between a component and an airbag cushion whereby inflation gas is provided to the airbag cushion for inflating the airbag cushion.

Further, references herein to a "lower portion" of a side pillar of a vehicle refer to about 50 percent of a total length of the side pillar as measured from a junction between the side pillar and the front instrument panel of the vehicle. For purposes of description herein, the total length of the side pillar is measured from the junction of the side pillar or side pillar internal trim with the front instrument panel to the junction of the side pillar or side pillar internal trim with the vehicle roof. References herein to an "upper portion" of a side pillar of a vehicle generally refer to about 50 percent of a total length of the side pillar as measured from a junction between the side pillar and the roof of the vehicle. Together, the lower portion and the upper portion of the side pillar form the entire side pillar.

Other objects and advantages will be apparent to those skilled in the art from the following detailed description taken in conjunction with the appended claims and drawings.

BRIEF DESCRIPTION OF THE DRAWINGS

FIGS. 3A-3D are fragmentary views of a vehicle illustrating a deployment process of an inflatable safety restraint assembly according to one embodiment of the invention. FIG. 3A illustrates the vehicle before deployment of the inflatable safety restraint assembly. FIG. 3B illustrates an airbag cushion upon initial deployment. FIG. 3C illustrates the airbag cushion at a second stage of deployment. FIG. 3D illustrates the airbag cushion upon full deployment.

DETAILED DESCRIPTION OF THE INVENTION

The present invention provides a side mounted inflatable safety restraint assembly that deploys an airbag cushion from a lower portion of a side pillar of a vehicle, such as a vehicle passenger A-pillar. The inflatable safety restraint assembly of the invention provides benefits over typical current airbag module assemblies disposed within the front instrument panel of a vehicle. For example, the inflatable safety restraint assembly of the invention can minimize or eliminate injuries to out-of-position occupants as the initial deployment of the airbag cushion originates in the lower side pillar of the vehicle, instead of the front instrument panel. Also, the airbag cushion initially deploys generally parallel to, and generally along, a lower portion of the vehicle windshield toward a longitudinal centerline of the vehicle, thus the initial deployment is not considered within the typical out-of-position occupant zone. Another advantage of the inflatable safety restraint assembly of the invention is that a full-size passenger airbag cushion (typically having a volume of 100-130 liters) is stored either entirely within the side pillar or partially within the lower side pillar and partially beneath the side pillar and the edge of the front instrument panel.

Figure 1:
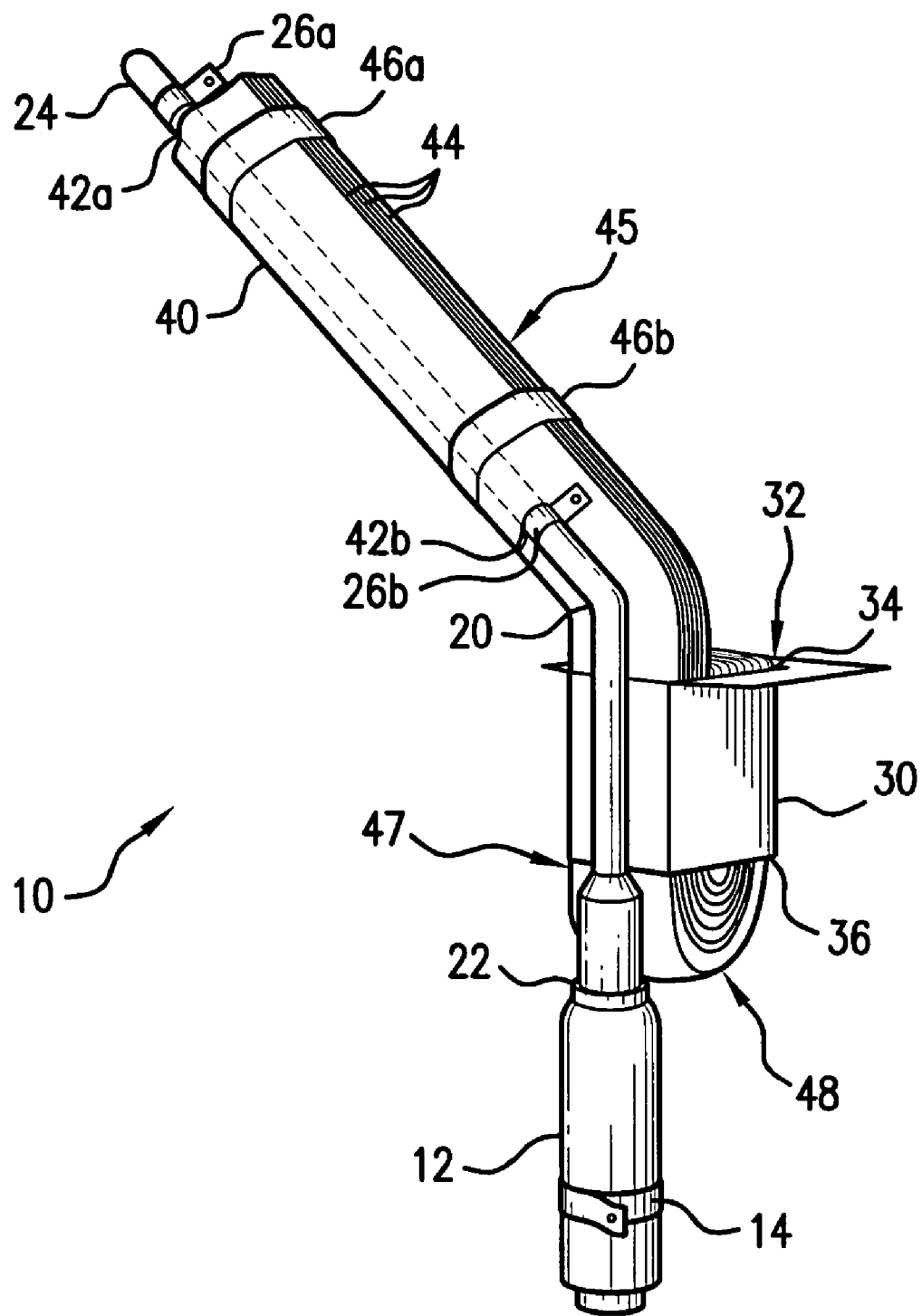
FIG. 1 is a perspective view of an inflatable safety restraint assembly according to one embodiment of the invention.

FIG. 1 is an inflatable safety restraint assembly 10 according to one embodiment of the invention. The inflatable safety restraint assembly 10 includes an inflator device 12. The inflator device 12 is an end-discharge inflator device, referring to a discharge of inflation gas, upon activation, at one end of the inflator device, typically through an inflator diffuser. In one embodiment of the invention, the inflator device 12 desirably has an inflation gas output sufficient to inflate a full size passenger side airbag, such as about a 3 to 5 mole output. As will be appreciated by one skilled in the art following the teachings herein provided, various types, sizes, and configurations of inflator devices are available for use in the inflatable safety restraint assembly of the invention. The inflator device 12 can be secured to a vehicle by an inflator bracket 14.

The inflatable safety restraint assembly 10 includes a gas flow control structure 20 connected in gas flow communication to the inflator device 12. The gas flow control structure 20 has a generally tubular configuration. The gas flow control structure 20 is connected at a first end 22 over an inflator diffuser (not shown) of the inflator device 12. The gas flow control structure 20 receives inflation gas supplied by the inflator device 12 at the first end 22. The gas flow control structure 20 is sealed at a second end 24 opposite the first end 22. The gas flow control structure 20 can be secured to a vehicle, for example to a side pillar frame of the vehicle, by one or more attachment clips 26, e.g., the attachment clamps 26a, 26b. As will be appreciated by one skilled in the art following the teachings herein provided, the gas flow control structure 20 can be formed of various materials such as, for example, rigid metallic tubing, flexible woven tubing, or other such structural tubing available in the art.

The inflatable safety restraint assembly 10 also includes a storage housing 30 attached to the gas flow control structure 20. The storage housing 30 defines a storage chamber 32 for receiving a portion of a folded airbag cushion 40. The storage chamber 32 at one end has a first chamber opening 34. The storage chamber 32 shown in FIG. 1 also includes a second chamber opening 36 at an end of the storage chamber 32 opposite the first chamber opening 34. In one embodiment of the invention, the storage chamber is desirably adapted to house about 50 percent of a folded airbag cushion. In another embodiment of the invention, the storage chamber desirably has a storage volume of about 0.6 liters. In one embodiment of the invention, in addition to storing a portion of the folded airbag cushion, the storage chamber 32 desirably acts as a guide to ensure that the airbag cushion can be rapidly, smoothly and/or steadily deployed undamaged. As will be appreciated by one skilled in the art following the teachings herein provided, the storage housing can be integrally formed as a one piece structure with the gas flow control structure or a portion of a multi-piece gas flow control structure, or the storage housing can be connected to the gas flow by means such as are known in the art, such as, for example, welding.

Figure 2:
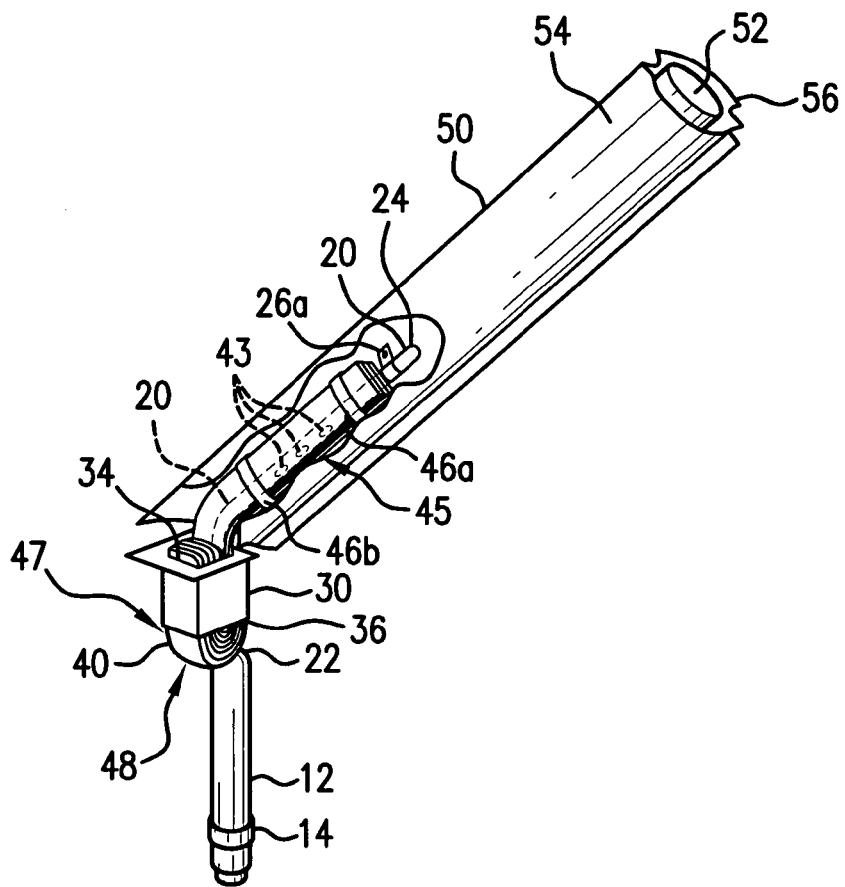
FIG. 2 is a fragmentary perspective view of the inflatable safety restraint assembly of FIG. 1 installed in a side pillar of a vehicle.

The airbag cushion 40 is connected in gas flow communication to the gas flow control structure 20. The gas flow control structure 20 extends into and through the airbag cushion 40 such that a portion (shown in phantom) of the gas flow control structure 20 is disposed within an inflation chamber of the airbag cushion 40. The airbag cushion 40 includes two openings 42a, 42b through which the gas flow control structure 20 extends. As shown in FIG. 2, the portion of the gas flow control structure 20 disposed within the airbag cushion 40 includes a plurality of gas exit holes 43 in inflation communication with an inflation chamber of the airbag cushion 40. Inflation gas is delivered to the airbag cushion 40 through the gas exit holes 43. The gas exit holes 43 are disposed in the gas flow control structure 20 in a direction toward a longitudinal centerline, such as shown in FIG. 3B as centerline A, of the vehicle to direct inflation gas in a cross-vehicle direction. As will be appreciated by one skilled in the art following the teachings herein provided, the longitudinal centerline of the vehicle, e.g., centerline A, is within a fore-aft centerplane that bisects the vehicle into symmetrical lateral halves. As will also be appreciated, such a centerplane is often generally referred to in the automobile industry as the X-Z plane of the vehicle.

The airbag cushion 40 can be fabricated using materials such as are known in the art, e.g., nylon fabric, and by methods such as are known in the art, e.g., cutting and sewing. In a static state before inflation, the airbag cushion 40 includes a plurality of folds 44 to provide a reduced size for storage. As shown in FIG. 1, a first, upper portion 45 of the folded airbag cushion 40 is connected to the gas flow control structure 20 by packaging bands 46a, 46b and a second, lower portion 47 of the folded airbag cushion 40 is folded at fold 48 and partially disposed within the storage chamber 32 of the storage housing 30. A portion of the airbag cushion 40 at the fold 48 extends out of the second chamber opening 36 of the storage housing 30. The packaging bands 46a, 46b are desirably formed such that, upon deployment of the airbag cushion 40, the packaging bands 46a, 46b are easily broken by the inflating airbag cushion 40.

FIG. 2 illustrates the inflatable safety restraint assembly 10 attached to a side pillar 50 of a vehicle. The side pillar 50 includes a side pillar frame 52 covered on an inner side by an internal trim panel 54 and covered on an outer side by an external panel 56. The typical side pillar, particularly a passenger side A-pillar, of the conventional vehicle generally does not contain many, if any, vehicle components other than the pillar frame 52. In the embodiment of the invention illustrated in FIG. 2, the airbag cushion 40 is secured to the gas flow control structure 20 and the gas flow control structure 20 is secured to the frame 52. A portion of the gas flow control structure 20, as well as the upper portion 45 of the airbag cushion 40, is disposed in a lower portion of the side pillar 50. The gas exit holes 43 are disposed in the portion of the gas flow control structure 20 that is disposed within the lower portion of the side pillar 50. The storage housing 30, the lower portion 47 of the folded airbag cushion 40, and the inflator device 12 are disposed below the side pillar 50 and are also disposed below a front instrument panel (not shown) of the vehicle. By locating the inflatable safety restraint assembly of the invention at the side of the vehicle and partially within the vehicle side pillar, the area below the front instrument panel of the vehicle is free for other uses such as for containing other vehicle components, such as heating and air-conditioning ducts and a larger glove box, and/or allowing for more passenger leg room.

In the inflatable safety restraint assembly according to one embodiment of this invention, a first, upper portion of an airbag cushion is disposed within a lower portion of the side pillar. A second, lower portion of the airbag cushion and the inflator device are disposed beneath the side pillar and/or an outer side edge of the front instrument panel. In one embodiment of the invention, the first, upper portion of the airbag cushion includes about 40 percent to about 60 percent of the full airbag cushion and the second, lower portion of the airbag cushion includes about 40 percent to about 60 percent of the full airbag cushion. As will be appreciated by one skilled in the art and following the teachings herein provided, the amount of the airbag cushion disposed in the side pillar and the amount of the airbag cushion disposed beneath the side pillar and/or front instrument panel can vary depending on, for example, the size and folding configuration of the airbag cushion, as well as the size and configuration of the vehicle. In another embodiment of the invention, a portion of the folded airbag cushion is disposed in each of the upper and lower portions of the side pillar as well as beneath the side pillar and/or the front instrument panel.

Upon activation of the inflator device, such as upon the occurrence of a collision, inflation gas flows into a gas flow control structure. The gas flow control structure directs the inflation gas into the lower portion of the side pillar and redirects the inflation gas in a cross-vehicle direction, i.e., toward a longitudinal centerline of the vehicle. The redirected inflation gas initially inflates the airbag cushion out through a deployment opening in the side pillar and across the front instrument panel in a direction toward the longitudinal centerline of the vehicle. The lower portion of the airbag cushion disposed beneath the side pillar and/or front instrument panel is pulled out through the deployment opening by the inflation of the upper portion within the side pillar. As will be appreciated by one skilled in the art following the teachings herein provided, alternative or additional means are available for directing airbag cushion inflation in the cross-car direction, such as, for example, specially designed airbag cushion folding patterns and/or tether systems. Upon reaching full inflation, the airbag cushion has cascaded or rolled down the front instrument panel toward the passenger side vehicle occupant.

FIGS. 3A-D illustrate the deployment in an automobile of an inflatable safety restraint assembly according to one embodiment of the invention, such as, for example the inflatable safety restraint assembly shown in FIGS. 1 and 2.

Figure 3A:
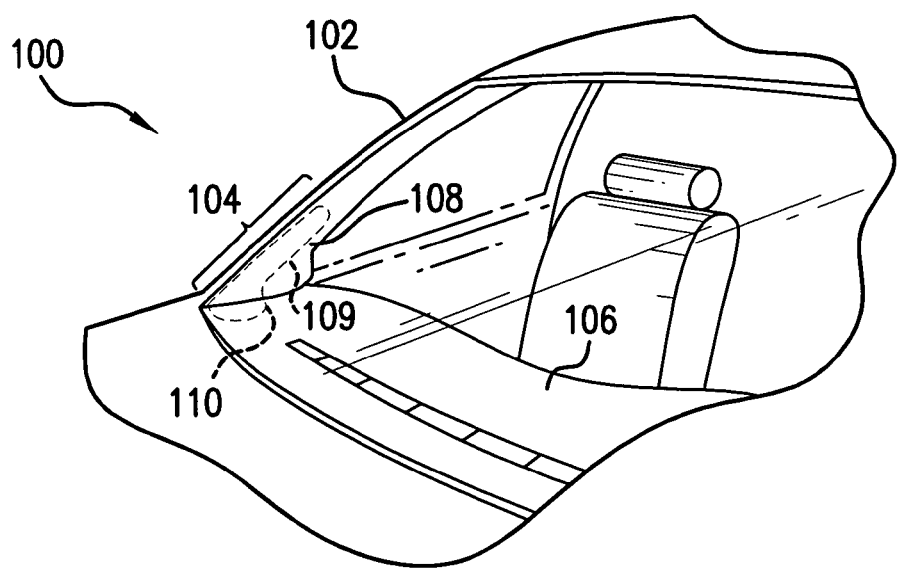

FIG. 3A shows a vehicle 100 before deployment of an airbag cushion of the inflatable safety restraint assembly. The vehicle 100 includes a passenger side pillar 102, more particularly a passenger side A-pillar. The side pillar 102 includes a lower portion 104 adjacent a front instrument panel 106 of the vehicle 100. The initial deployment of the airbag cushion occurs from the lower portion 104 of the side pillar 102. The vehicle 100 includes a rupturable airbag deployment area 108 through which the airbag cushion deploys during inflation of the airbag cushion. The rupturable airbag deployment area 108 includes a first deployment area portion 109 in the lower portion 104 of the side pillar 102. The rupturable airbag deployment area 108 also includes a second deployment area portion 110 in the instrument panel 106 of the vehicle 100. The second deployment area portion 110 is adjacent to the first deployment area portion 109 at the junction of the side pillar 102 and the front instrument panel 106.

Upon deployment of the airbag cushion, the rupturable airbag deployment area 108 ruptures or otherwise opens to form or uncover a deployment opening to allow the airbag cushion to inflate into the vehicle passenger cabin. The first deployment area portion 109 and the second deployment area portion 110 are adjacent at the junction of the side pillar 102 and the front instrument panel 106 such that upon rupture of rupturable deployment area 108 the deployment opening formed by the ruptured rupturable airbag deployment area 108 extends from the lower portion 104 of the side pillar 102 into the front instrument panel 106. As discussed above, a plastic trim typically covers the inner side of a vehicle side pillar. In one embodiment of the invention, the plastic side pillar trim in the rupturable airbag deployment area 108 is modified to allow the airbag cushion to break through the plastic trim. As will be appreciated by one skilled in the art following the teachings herein provided, the rupturable airbag deployment area can include various configurations and/or be formed by various means such as those known in the art. For example, the rupturable airbag deployment area can be formed by a thin, weakened outline formed in a trim of the side pillar and the front instrument panel. The side pillar trim piece can also extend to cover the deployment opening in the front instrument panel. In another embodiment of the invention, the rupturable airbag deployment area can include one or more separate covering panel(s) that cover the deployment opening of the rupturable deployment area. In yet another embodiment of the invention, a panel covering the deployment opening in the rupturable airbag deployment area is connected to the side pillar trim by a hinge that allows for hinged opening of the panel during deployment of the airbag cushion. In another embodiment of the invention, a panel over the deployment opening, or other rupturable portion of the side pillar, is connected to the side pillar or the side pillar trim by a tether that, upon airbag deployment, maintains the connection of the ruptured panel with the side panel.

FIG. 3B illustrates initial deployment of an airbag cushion 112 from the lower portion 104 of the side pillar 102. The inflating airbag cushion 112 ruptures or otherwise opens the rupturable deployment area 108 and initially inflates out a deployment opening 114 in a direction parallel to a windshield of the vehicle 100 and indicated by arrows 116. The initial deployment of the airbag cushion 112 generally occurs in a direction toward a longitudinal centerline of the vehicle 100, i.e., a centerline A of the vehicle extending through the front of the vehicle 100 and the rear of the vehicle 100. FIG. 3C illustrates the airbag cushion 112 at a second stage of deployment. As illustrated in FIG. 3C by arrow 116a, a portion of the inflating airbag cushion 112 is being pulled from below the front instrument panel 106. As discussed above, the inflatable safety restraint assembly of one embodiment of the invention includes a storage housing (not shown), which contains a portion of the folded static airbag cushion 112, and an inflator device (not shown) disposed below the side pillar 102 and disposed below the front instrument panel 106. The airbag cushion 112 is connected in gas flow communication to a gas flow control structure (not shown) extending into the lower portion 104 of the side pillar 102. The gas flow control structure includes gas exit holes disposed toward the longitudinal centerline of the vehicle 100. Upon activation of the inflator device, inflation gas is directed by the gas exit holes toward the longitudinal centerline of the vehicle 100, thereby initially inflating the airbag cushion 112 toward the longitudinal centerline of the vehicle. As the airbag cushion 112 deploys from the lower portion of the side panel 102, the portion of the folded airbag cushion 112 disposed within the storage housing is pulled out of the deployment opening 114 as indicated by arrow 116a.

FIG. 3D illustrates the airbag cushion 112 at full deployment, i.e., full inflation. As discussed above, the airbag cushion 112 initially deploys generally toward the longitudinal centerline of the vehicle 100. As illustrated in FIG. 3D, generally after deployment across the front instrument panel generally parallel to the windshield, the airbag cushion 112 inflates toward the passenger seat 120, as indicated by arrows 122, and the inflating airbag cushion 112 cascades or rolls down the front instrument panel 106, as indicated by arrows 124. The deployment process illustrated in FIGS. 3A-D shows how the airbag cushion of the inflatable safety restraint assembly of the invention is a side mounted frontal impact airbag cushion. The inflatable safety restraint assembly of the invention provides improved protection for out-of-position occupants by eliminating the need for the relatively large deployment door used with available front passenger airbag modules installed beneath the front instrument panel and also by placing the initial deployment of the airbag cushion at the corner of the instrument panel away from the passenger.

Figure 4:
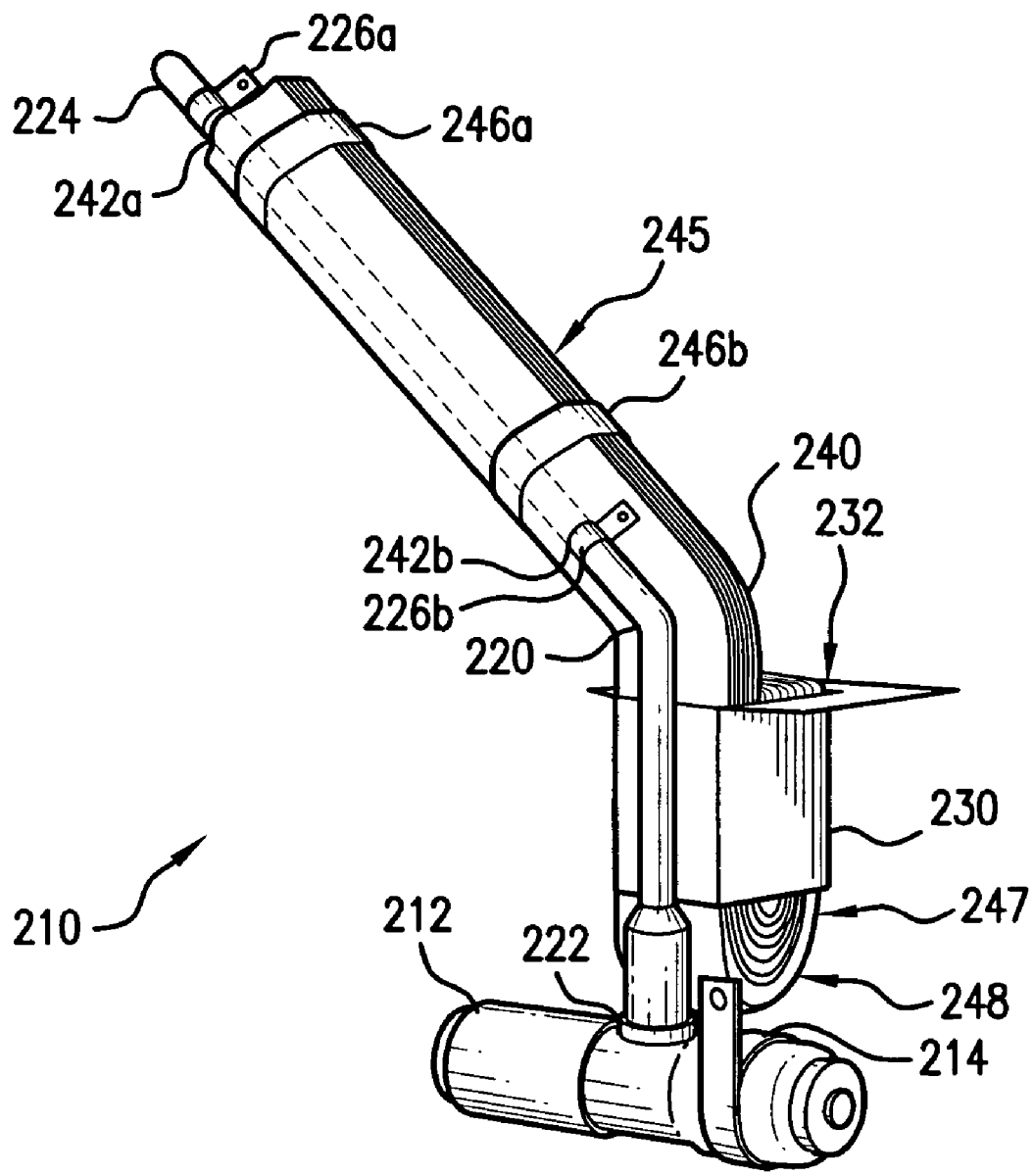
FIG. 4 is a perspective view of an inflatable safety restraint assembly according to another embodiment of the invention.

The inflatable safety restraint assembly of the invention improves out-of-position protection even without the use of generally more complex, and thus generally more expensive, dual stage inflators often used in current passenger side airbag modules, and the inflatable safety restraint assembly of the invention can incorporate generally less complex, and thus generally less expensive, single stage inflator devices. However, the invention is not intended to be limited to the use of single stage inflator devices. FIG. 4 is an inflatable safety restraint assembly 210 according to another embodiment of the invention. The inflatable safety restraint assembly 210 includes an inflator device 212. The inflator device 212 is a dual stage side-discharge inflator device. A side discharge inflator device is an inflator device that discharges inflation gas, upon activation, at a side of the inflator device, typically through an inflator diffuser. The inflator device 212 can be secured to a vehicle by an inflator bracket 214.

The inflatable safety restraint assembly 210 includes a gas flow control structure 220 connected in gas flow communication to the inflator device 212. The gas flow control structure 220 is connected at a first end 222 over the inflator diffuser (not shown) of the inflator device 212. The gas flow control structure 220 receives inflation gas supplied by the inflator device 212 at the first end 222. The gas flow control structure 220 is generally tubular in configuration and sealed at a second end 224 opposite the first end 222. The gas flow control structure 220 can be secured to a vehicle, for example to a passenger side A-pillar frame of the vehicle, by one or more attachment clamps 226, e.g., the attachment clamps 226a, 226b. The inflatable safety restraint assembly 210 also includes a storage housing 230 attached to the gas flow control structure 220. The storage housing 230 defines a storage chamber 232 for receiving a portion of a folded airbag cushion 240.

The airbag cushion 240 is folded and connected in gas flow communication to the gas flow control structure 220. The gas flow control structure 220 extends into and through the airbag cushion 240 such that a portion (shown in phantom) of the gas flow control structure 220 is disposed within an inflation chamber of the airbag cushion 240. The airbag cushion 240 includes two openings 242a, 242b through which the gas flow control structure 220 extends into the airbag cushion 240. The portion of the gas flow control structure 220 disposed within the airbag cushion 240 includes at least one, and desirably a plurality of, gas exit holes (not shown) in inflation communication with an inflation chamber of the airbag cushion 240.

As illustrated in FIG. 4, in a static state, a first, upper portion 245 of the folded airbag cushion 240 is connected to the gas flow control structure 220 by packaging bands 246, e.g., the packaging bands 246a, 246b, and a second, lower portion 247 of the folded airbag cushion 240 is folded at fold 248 and partially disposed within the storage chamber 232 of the storage housing 230.

Figure 5:
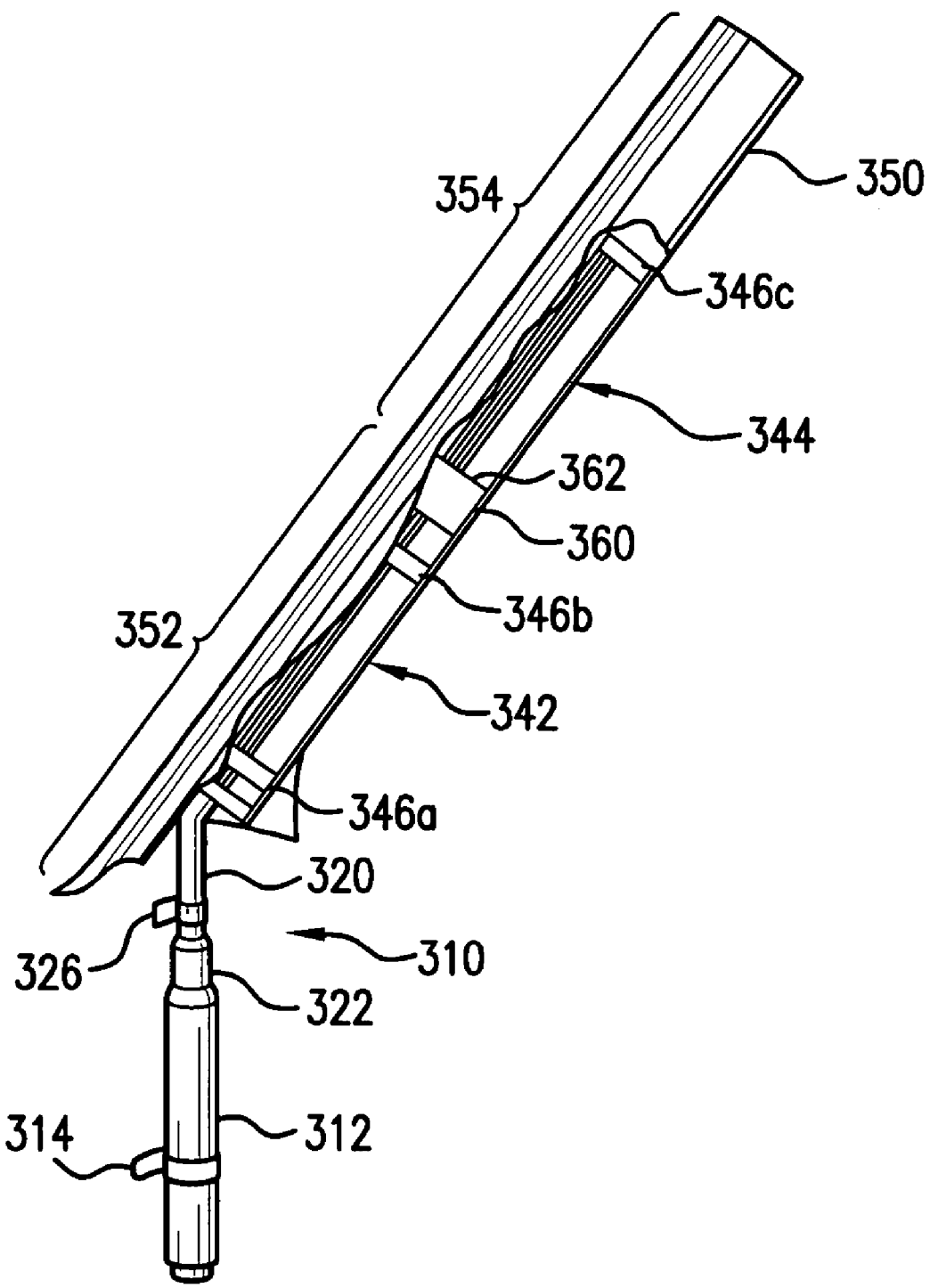
FIG. 5 is a fragmentary perspective view of an inflatable safety restraint assembly according to yet another embodiment of the invention.

FIG. 5 is an inflatable safety restraint assembly 310 according to yet another embodiment of the invention. The inflatable safety restraint assembly 310 is attached to a side pillar 350 of a vehicle. The inflatable safety restraint assembly 310 includes an inflator device 312 disposed below the side pillar 350. The inflator device 312 also would be disposed below a front instrument panel (not shown) of the vehicle. The inflator device 312 is an end-discharge inflator device, but, as will be appreciated by one skilled in the art following the teachings herein provided, various types, sizes, and configurations of inflator devices are available for use in the inflatable safety restraint assembly 310. The inflator device 312 can be secured to a vehicle by an inflator bracket 314.

The inflatable safety restraint assembly 310 includes a gas flow control structure 320 connected in gas flow communication to the inflator device 312. The gas flow control structure 320 is connected at a first end 322 over an inflator diffuser (not shown) of the inflator device 312. The gas flow control structure 320 receives inflation gas supplied by the inflator device 312, upon activation of the inflator device 312, at the first end 322. The gas flow control structure 320 can be secured to a vehicle by one or more attachment clamps, such as attachment clamp 326.

A folded airbag cushion 340 is connected in gas flow communication with the gas flow control structure 320, and thus also connected in gas flow communication to the inflator device 312. In the embodiment of the invention illustrated in FIG. 5, the entire folded airbag cushion 340 is disposed in the side pillar when in a static state before inflation. In the static state, a first, lower portion 342 of the airbag cushion 340 is disposed in a lower portion 352 of the side pillar 350 and a second, upper portion 344 of the airbag cushion 340 is disposed in an upper portion 354 of the side pillar 350. As shown in FIG. 5, the folded airbag cushion 340 is connected to the gas flow control structure 320 by packaging bands 346a, 346b and connected to a frame of the side pillar 350 by a packaging band 346c.

A portion of the gas flow control structure 320 is disposed within the lower portion 353 of the side pillar 350. In one embodiment of this invention, the gas flow control structure does not extend into the upper portion 354 of the side pillar 350. The portion of the gas flow control structure 320 within the lower portion 353 of the side pillar 350 extends through the lower portion 342 of the airbag cushion 340 in a manner such as described above with reference to FIGS. 1 and 4. The portion of the gas flow control structure 320 disposed within the airbag cushion 340 includes at least one, and desirably a plurality of, gas exit holes in inflation communication with an inflation chamber of the airbag cushion. Inflation gas is delivered to the airbag cushion through the gas exit holes. As will be appreciated by one skilled in the art following the teachings herein provided, the invention is not limited by the length or configuration of the gas flow control structure, and in one embodiment of the invention, the gas flow control structure extends into the upper portion of the vehicle side pillar and the upper packaging band secures the upper portion of the airbag cushion to the upper portion of the gas flow control structure. However, the gas exit holes of the gas flow control structure are disposed in the portion of the gas flow control structure within the lower portion of the vehicle side pillar to deploy the airbag cushion from the lower portion of the vehicle side pillar.

The inflatable safety restraint assembly 310 includes a tubular deployment guide 360 disposed about at a midpoint of the side pillar 350. The deployment guide 360 has a guide opening 362 extending through the deployment guide 360. The deployment guide 360 is attached to the gas flow control structure 320 at a second end opposite the first end 322 and attached between the gas exit holes and the upper portion 354 of the side pillar 350. In a static state before inflation, a portion of the airbag cushion 340 extends through the guide opening 362. Upon activation of the inflator device 312, inflation gas enters an inflation chamber of the folded airbag cushion and begins inflating the airbag cushion 340. The airbag cushion deploys out through a deployment area or opening in the lower portion 352 of the side pillar 350. As the airbag cushion 340 deploys, the upper packaging band 346c breaks and the upper portion 344 of the folded airbag cushion is pulled through the deployment opening 362 of the deployment guide 360 and the full deployment of the airbag cushion from the side pillar 350 occurs through the lower portion 352 of the side pillar 350.

Thus, the invention provides an inflatable safety restraint assembly that includes a lower side pillar mounted frontal impact airbag cushion. The inflatable safety restraint assembly of the invention provides improved protection for out-of-position occupants by eliminating a relatively large instrument panel deployment door and placing the initial deployment of the airbag cushion at the corner of the front instrument panel away from the passenger. The inflatable safety restraint assembly of the invention can reduce the cost of airbag cushion installations by reducing or eliminating the need for occupant presence and/or position sensors. In addition, the inflatable safety restraint assembly of the invention can incorporate generally less complex single stage inflator devices instead of generally more complex, and generally more expensive, dual stage inflators. The inflatable safety restraint assembly of the invention also frees space under the front instrument panel for other vehicle components such as heating and air-conditioning ducts and a larger glove box, as well as allowing for more passenger leg room.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflatable safety restraint assembly for a vehicle, the vehicle having a side pillar, a front instrument panel and a vehicle passenger cabin, the inflatable safety restraint assembly comprising:
   an inflator device; and
   an airbag cushion connected in gas flow communication with the inflator device;
   wherein the airbag cushion is a side mounted frontal impact airbag cushion, in a static state a first portion of the airbag cushion is disposed in a lower portion of the side pillar of the vehicle and a second portion of the airbag cushion is disposed below the front instrument panel, and initial deployment of the airbag cushion from the side pillar into the vehicle passenger cabin occurs only below an upper portion of the side pillar, the upper portion of the side pillar being an upper 50 percent of the total length of the side pillar.

2. The inflatable safety restraint assembly of claim 1 wherein initial deployment of the airbag cushion occurs from the lower portion of the side pillar.

3. The inflatable safety restraint assembly of claim 2 wherein the initial deployment of the airbag cushion occurs in a direction toward a longitudinal centerline of the vehicle.

4. The inflatable safety restraint assembly of claim 2 wherein the airbag cushion deploys through a rupturable airbag deployment area of the side pillar.

5. The inflatable safety restraint assembly of claim 1 wherein the vehicle additionally comprises a front instrument panel and the inflator device is disposed below at least one of the side pillar and the front instrument panel.

6. The inflatable safety restraint assembly of claim 1 additionally comprising a gas flow control structure connecting the airbag cushion in gas flow communication with the inflator device, wherein at least a portion of the gas flow control structure is disposed within the lower portion of the side pillar.

7. The inflatable safety restraint assembly of claim 6 wherein the side pillar includes a frame, the airbag cushion is secured to the gas flow control structure and the gas flow control structure is secured to the frame.

8. The inflatable safety restraint assembly of claim 6 wherein only the portion of the gas flow control structure disposed within the lower portion of the side pillar includes at least one inflation gas exit hole in inflation communication with an inflation chamber of the airbag cushion, the at least one inflation gas exit hole disposed on a side of the gas flow control structure toward a longitudinal centerline of the vehicle.

9. The inflatable safety restraint assembly of claim 8 additionally comprising a storage housing defining a storage chamber, the storage chamber having a chamber opening at one end, the storage housing connected to the gas flow control structure and disposed below the vehicle instrument panel, wherein in a static state the airbag cushion second portion is at least partially disposed within the storage chamber.

10. The inflatable safety restraint assembly of claim 9 wherein the vehicle additionally comprises a rupturable airbag deployment area, the airbag deployment area having a first deployment area portion in the lower portion of the side pillar and a second deployment area portion in the instrument panel of the vehicle.

11. The inflatable safety restraint assembly of claim 8 wherein in a static state a first portion of the airbag cushion is disposed in the lower portion of the side pillar and a second portion of the airbag cushion is disposed in an upper portion of the side pillar.

12. The inflatable safety restraint assembly of claim 11 additionally comprising a deployment guide having a guide opening, the deployment guide attached to the gas flow control structure between the at least one gas exit hole and the upper portion of the side pillar, wherein in a static state a portion of the airbag cushion extends through the guide opening.

13. The inflatable safety restraint assembly of claim 11 wherein the entire airbag cushion is disposed in the side pillar.

14. The inflatable safety restraint assembly of claim 1 wherein the side pillar is a vehicle passenger side A-pillar.

15. The inflatable safety restraint assembly of claim 1 wherein the inflator device is a dual stage inflator device.

16. An inflatable safety restraint assembly for a vehicle having a front instrument panel, a side pillar and a vehicle passenger cabin, the inflatable safety restraint assembly comprising:
  an inflator device;
  a gas flow control structure connected in gas flow communication to the inflator device to receive inflation gas supplied by the inflator device;
  a storage housing attached to the gas flow control structure, the storage housing defining a storage chamber; and
  an airbag cushion connected in gas flow communication to the gas flow control structure;
  wherein a portion of the gas flow control structure is disposed in the side pillar, the storage housing is disposed below the front instrument panel, in a static state a first portion of the airbag cushion is disposed in the side pillar and a second portion of the airbag cushion is disposed in the storage chamber, and initial deployment of the airbag cushion from the side pillar into the vehicle passenger cabin occurs only below an upper portion of the side pillar, the upper portion of the side pillar being an upper 50 percent of the total length of the side pillar.

17. The inflatable safety restraint assembly of claim 16 wherein the airbag cushion is a side mounted frontal impact airbag cushion.

18. The inflatable safety restraint assembly of claim 16 wherein initial deployment of the airbag cushion occurs from the lower portion of the side pillar.

19. The inflatable safety restraint assembly of claim 18 wherein the initial deployment of the airbag cushion occurs in a direction toward a longitudinal centerline of the vehicle.

20. The inflatable safety restraint assembly of claim 18 wherein the airbag cushion deploys through a rupturable airbag deployment area of the side pillar.

21. The inflatable safety restraint assembly of claim 16 wherein the portion of the gas flow control structure disposed within the lower portion of the side pillar includes at least one inflation gas exit hole in inflation communication with an inflation chamber of the airbag cushion, the at least one inflation gas exit hole disposed on a side of the gas flow control structure toward a longitudinal centerline of the vehicle.

22. The inflatable safety restraint assembly of claim 16 wherein the vehicle additionally comprises a rupturable airbag deployment area, the airbag deployment area having a first deployment area portion in the lower portion of the side pillar and a second deployment area portion in the instrument panel of the vehicle.

23. The inflatable safety restraint assembly of claim 16 wherein the side pillar is a vehicle passenger side A-pillar.

24. The inflatable safety restraint assembly of claim 16 wherein the inflator device is a dual stage inflator device.

* * * * *